United States Patent
Peng

(10) Patent No.: US 9,742,455 B1
(45) Date of Patent: Aug. 22, 2017

(54) TRANSMISSION DOCK OF ELECTRONIC DEVICE

(71) Applicant: Getac Technology Corporation, Hsinchu County (TW)

(72) Inventor: Cheng-Shih Peng, Taipei (TW)

(73) Assignee: GETAC TECHNOLOGY CORPORATION, Hsinchu County (TW)

(*) Notice: Subject to any disclaimer, the term of this patent is extended or adjusted under 35 U.S.C. 154(b) by 0 days.

(21) Appl. No.: 15/296,226

(22) Filed: Oct. 18, 2016

(51) Int. Cl.
*H04M 1/04* (2006.01)
*H04B 1/3877* (2015.01)

(52) U.S. Cl.
CPC ............ *H04B 1/3877* (2013.01); *H04M 1/04* (2013.01)

(58) Field of Classification Search
CPC ..... H04B 1/3877; H04B 1/3888; H04M 1/04; G06F 1/1632; A45C 2011/002; A45F 2200/0516
See application file for complete search history.

(56) References Cited

U.S. PATENT DOCUMENTS

| | | | | |
|---|---|---|---|---|
| 9,118,749 B2* | 8/2015 | Kim | ............... | H04M 1/0254 |
| 9,261,919 B2* | 2/2016 | Webb | ............... | G06F 1/1632 |
| 9,318,906 B2* | 4/2016 | Kim | ............... | H02J 7/0044 |
| 2006/0250764 A1* | 11/2006 | Howarth | ............... | G06F 1/1632 |
| | | | | 361/679.41 |
| 2007/0047198 A1* | 3/2007 | Crooijmans | .......... | G06F 1/1632 |
| | | | | 361/679.41 |
| 2012/0161706 A1* | 6/2012 | Zhou | ............... | F16M 11/041 |
| | | | | 320/115 |
| 2012/0275092 A1* | 11/2012 | Zhou | ............... | F16M 13/00 |
| | | | | 361/679.01 |
| 2013/0005179 A1* | 1/2013 | Aldana | ............... | H01R 13/6315 |
| | | | | 439/529 |
| 2013/0058036 A1* | 3/2013 | Holzer | ............... | G06F 1/1632 |
| | | | | 361/679.44 |
| 2013/0217448 A1* | 8/2013 | Kim | ............... | H04M 1/0254 |
| | | | | 455/575.1 |
| 2013/0241470 A1* | 9/2013 | Kim | ............... | H02J 7/0044 |
| | | | | 320/107 |
| 2014/0069710 A1* | 3/2014 | Webb | ............... | H05K 7/14 |
| | | | | 174/549 |
| 2014/0185262 A1* | 7/2014 | Hashimoto | ............ | F16M 13/00 |
| | | | | 361/809 |
| 2015/0098184 A1* | 4/2015 | Tsai | ............... | G06F 1/1632 |
| | | | | 361/679.56 |
| 2015/0331452 A1* | 11/2015 | Byrne | ............... | G06F 1/1632 |
| | | | | 361/679.44 |
| 2017/0153667 A1* | 6/2017 | Suckle | ............... | G06F 1/1632 |

* cited by examiner

*Primary Examiner* — Devan Sandiford
(74) *Attorney, Agent, or Firm* — Locke Lord LLP; Tim Tingkang Xia, Esq.

(57) ABSTRACT

A transmission dock for an electronic device includes a casing and a floatable connecting component. The casing includes a receiving chamber and two first limiting structures. A through opening is disposed at the bottom of the receiving chamber. The first limiting structures flank the through opening. The floatable connecting component includes a body, a transmission interface, and two second limiting structures. The body is movably disposed in the through opening. The transmission interface is disposed on the body. The second limiting structures are disposed on two opposing sides of the body, respectively. The second limiting structures and the first limiting structures moveably mate with each other, respectively, and limit each other, respectively.

10 Claims, 7 Drawing Sheets

TRANSMISSION DOCK OF ELECTRONIC DEVICE

BACKGROUND OF THE INVENTION

Field of the Invention

The present invention relates to docks and, more particularly, to a transmission dock for an electronic device.

Description of the Prior Art

To meet the requirements for transmission power or transmission data, conventional portable or demountable electronic devices, such as mobile phones, tablets, detachable notebooks (whose display units are detachable from keyboards), and navigators, each typically come with at least one connection interface so that users can connect an appropriate transmission line or transmission dock to the connection interface, allowing the electronic device to be charged or to effectuate data transmission through an external power source.

The transmission dock usually has a recess for holding an electronic device. A terminal unit corresponding in position to the connection interface is disposed at a chamber bottom of the transmission dock. The terminal unit is inserted into the connection interface of the electronic device as soon as the electronic device is appropriately placed in the recess, constructing an electrical connection between the electronic device and the transmission dock. Furthermore, the electronic device can be erected while being held in the transmission dock so that the user can watch the display unit of the electronic device conveniently.

SUMMARY OF THE INVENTION

An electronic device and a conventional transmission dock cannot be firmly connected. As a result, if the electronic device or the transmission dock is hit or begins to shake, the connection between the electronic device and the transmission dock might interrupt or become insecure, thereby compromising a charging process or interrupting data transmission.

In view of this, the present invention provides a transmission dock for an electronic device to ensure that the electronic device can be charged through the transmission dock and can perform transmission data through the transmission dock smoothly without interruption.

In an embodiment, transmission dock for an electronic device comprises a casing and a floatable connecting component. The casing comprises a receiving chamber and two first limiting structures. A through opening is disposed at a chamber bottom of the receiving chamber. The two first limiting structures flank the through opening. The floatable connecting component comprises a body, a transmission interface and two second limiting structures. The body is movably disposed in the through opening. The transmission interface is disposed on the body. The two second limiting structures are disposed on the two opposing sides of the body, respectively. The two second limiting structures and the two first limiting structures moveably mate with each other, respectively, and limit each other, respectively.

In an embodiment, the first limiting structures each comprise a sidewall having thereon a limiting opening. The second limiting structures each comprise a protruding post. The two protruding posts of the two second limiting structures are penetratingly disposed in the two limiting openings of the two first limiting structures, respectively.

In an embodiment, the protruding posts each have an oblong cross section.

In an embodiment, the sidewall comprises a first sidewall, a second sidewall, a third sidewall and a fourth sidewall which together form the limiting opening. The first and third sidewalls are opposite and face the chamber bottom. The second and fourth sidewalls are opposite and disposed between the first and third sidewalls.

In an embodiment, the first sidewall has a larger length than the third sidewall.

In an embodiment, the fourth sidewall is closer to the chamber bottom than the second sidewall, and an acute angle is formed between an extending direction of the second sidewall and the chamber bottom.

In an embodiment, the sidewall comprises a first portion and a demountable second portion. The first portion is positioned at the chamber bottom. The first portion and the second portion are connected to form the limiting openings.

In an embodiment, the floatable connecting component further comprises two magnetic units. The two magnetic units are disposed on the body and on two sides of the transmission interface, respectively.

In an embodiment, the floatable connecting component further comprises two positioning units. The two positioning units are disposed on the body and on two sides of the transmission interface, respectively.

In an embodiment, the transmission interface comprises a plurality of resilient terminals.

In an embodiment, the floatable connecting component further comprises two resilient ground terminals. The two resilient ground terminals are disposed on the body and on two sides of the transmission interface, respectively.

In another embodiment, the first limiting structures each comprise a protruding post. The second limiting structures each comprise a sidewall, with the sidewall having thereon a limiting opening. The two protruding posts of the two first limiting structures are penetratingly disposed in the two limiting openings of the two second limiting structures, respectively.

In conclusion, the transmission dock for an electronic device, which is provided according to an embodiment of the present invention, is characterized in that the floatable connecting component floats and undergoes a displacement relative to the chamber bottom of the transmission dock to a certain extent. With the electronic device being disposed in the receiving chamber of the transmission dock and appropriately connected to transmission interface of the floatable connecting component, if the electronic device or the transmission dock is hit or begins to shake and thus the electronic device sways laterally or tilts forward relative to the transmission dock, the floatable connecting component will undergo a displacement accordingly such that the transmission interface keeps connecting with the electronic device, rendering their electrical connection relationship stable and inseverable, to ensure that the electronic device can be charged through the transmission dock and can perform transmission data through the transmission dock smoothly without interruption.

The features and advantages of the present invention are described in detail in the preferred embodiments of the present invention so as to enable persons skilled in the art to gain insight into the technical disclosure in the present invention and implement the present invention accordingly and readily understand the objectives and advantages of the present invention by making reference to the disclosure contained in the specification, the claims, and the drawings of the present invention.

DETAILED DESCRIPTION OF THE EMBODIMENTS

Figure 1:
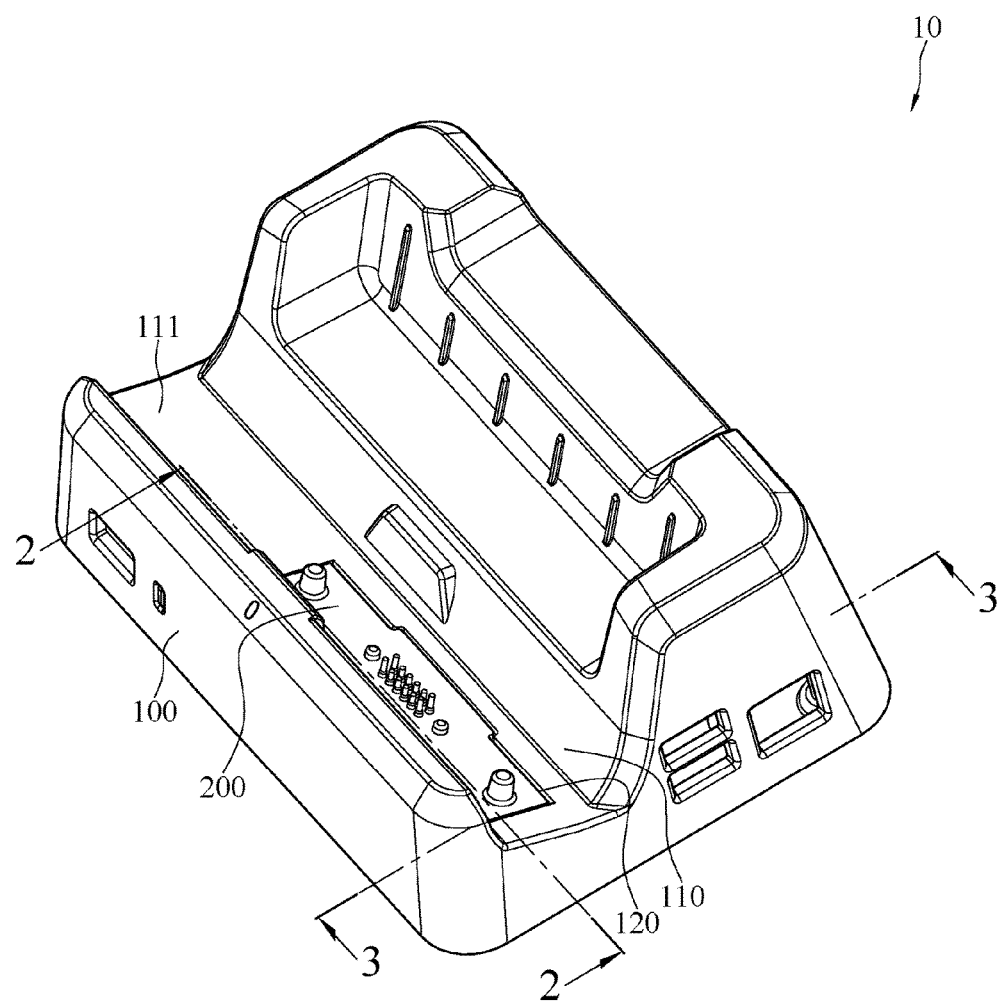
FIG. 1 is a schematic view of a transmission dock for an electronic device according to an embodiment of the present invention.

Referring to FIG. 1, there is shown a schematic view of a transmission dock 10 for an electronic device according to an embodiment of the present invention. The transmission dock 10 and an electronic device (not shown) mate with each other. For example, a user puts the electronic device in the transmission dock 10 to allow the electronic device to be charged or to transmit data through the transmission dock 10.

In some embodiments, the electronic device is a mobile phone, a tablet, a display unit part detachable from a notebook to function as a tablet, or a navigator, but the present invention is not limited thereto. In some embodiments, the transmission dock 10 is a standalone external device, but the present invention is not limited thereto. In some other embodiments, the transmission dock 10 and the electronic device together form an integral device. Take a detachable notebook as an example, the electronic device can be a display unit part of the detachable notebook, whereas the transmission dock 10 can be a keyboard part of the detachable notebook. The electronic device is appropriately connected to the transmission dock 10 to form an integral notebook.

The transmission dock 10 comprises a casing 100 and a floatable connecting component 200. The casing 100 comprises a receiving chamber 110. A through opening 120 is disposed at a chamber bottom 111 of the receiving chamber 110. The floatable connecting component 200 corresponds in position to the through opening 120. The electronic device gets connected to the floatable connecting component 200 of the chamber bottom 111 as soon as the electronic device is inserted into the receiving chamber 110.

Figure 2:
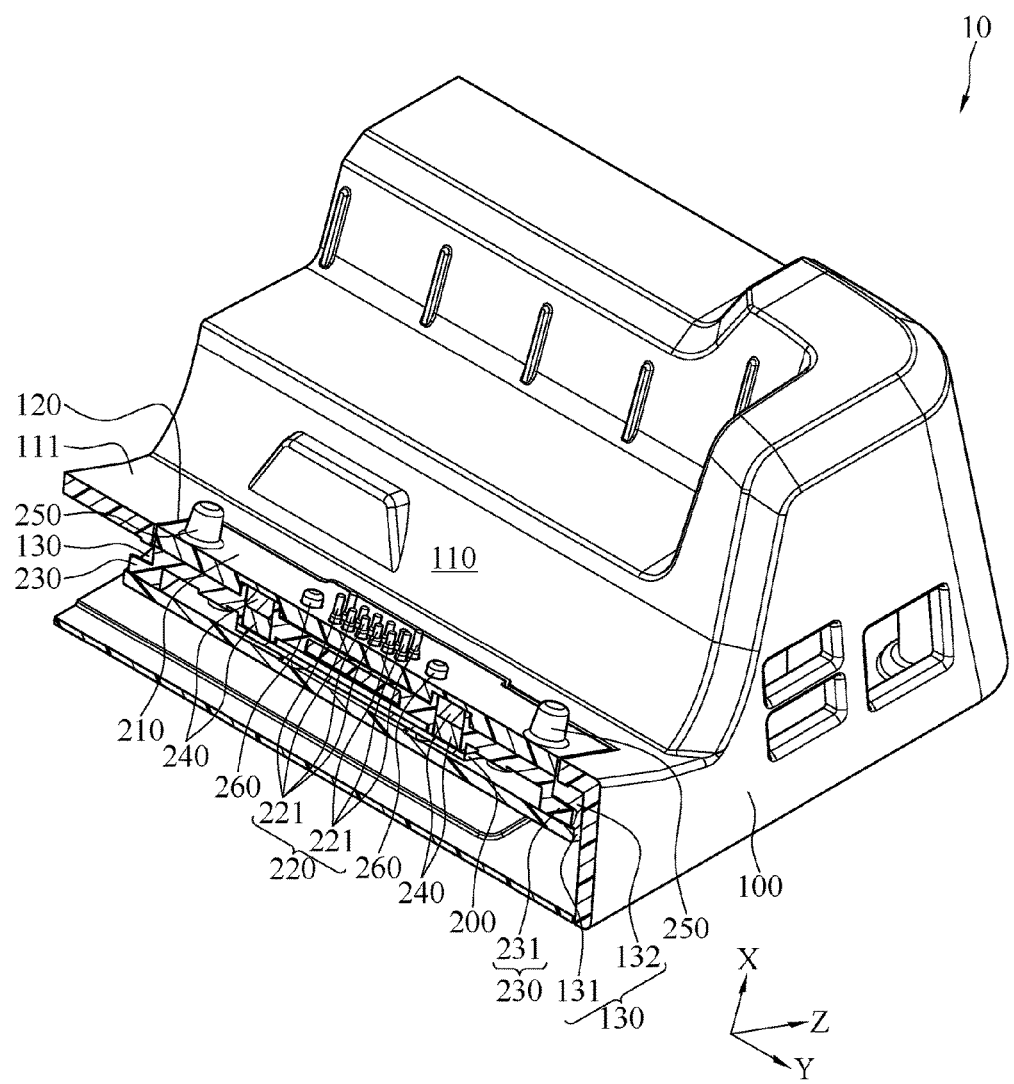
FIG. 2 is a cutaway view of the transmission dock taken along line 2-2 of FIG. 1.

Referring to FIG. 2, there is shown a cutaway view of the transmission dock 10 taken along line 2-2 of FIG. 1. In practice, the casing 100 of the transmission dock 10 has therein various electronic components (such as a circuit board, chips, capacitors and/or wires) and various fixing components (such as screws and/or rivets). To render explanation and comprehension easy, the diagram omits the aforesaid electronic components and fixing components. Referring to FIG. 1 and FIG. 2, the casing 100 comprises two first limiting structures 130. The two first limiting structures 130 are disposed in the casing 100 and connected to the chamber bottom 111. The two first limiting structures 130 flank the through opening 120. The floatable connecting component 200 comprises a body 210, a transmission interface 220 and two second limiting structures 230. The body 210 is floatably disposed in the through opening 120, whereas the transmission interface 220 is disposed on the body 210. The two second limiting structures 230 are disposed on two opposing sides in the lengthwise direction of the body 210, respectively. The two second limiting structures 230 and the two first limiting structures 130 moveably mate with each other, respectively, and limit each other, respectively. Therefore, each first limiting structure 130 and a corresponding one of the second limiting structures 230 together form an integral limit mechanism. Each first limiting structure 130 and a corresponding one of the second limiting structures 230 are movable relative to each other, but the movement is subjected to a limit and thus the displacement falls within a specific range of distance. Accordingly, the body 210 is capable of moving relative to the casing 100 to a certain extent in accordance with the relative movement capability of the first limiting structures 130 and the second limiting structures 230. Since the transmission interface 220 is fixed to the body 210, the transmission interface 220 moves together with the body 210. Therefore, the body 210 and the transmission interface 220 are movable relative to the casing 100 to a certain extent.

In an embodiment, the electronic device has a connection interface (not shown). The connection interface and the transmission interface 220 of the transmission dock 10 mate with each other. Therefore, the transmission interface 220 of the transmission dock 10 gets connected to the connection interface of the electronic device as soon as the electronic device is inserted into the receiving chamber 110 of the transmission dock 10, so as to construct a power transmission channel and a data transmission channel between the electronic device and the transmission dock 10. Accordingly, power and data is transmitted between the transmission dock 10 and the electronic device through the connection interface of the electronic device and the transmission interface 220 of the transmission dock 10.

Referring to FIG. 1 and FIG. 2, in some embodiments, the transmission interface 220 comprises a plurality of resilient terminals 221 (Pogo pins). In this situation, the connection interface of the electronic device comprises a plurality of terminal jacks (not shown). The resilient terminals 221 are inserted into the terminal jacks of the electronic device, respectively, such that the transmission interface 220 is electrically connected to the electronic device. In this embodiment, the resilient terminals 221 are for use in power and data transmission. In a variant embodiment, in addition to power and data transmission, the resilient terminals 221 are for use in grounding.

Figure 3:
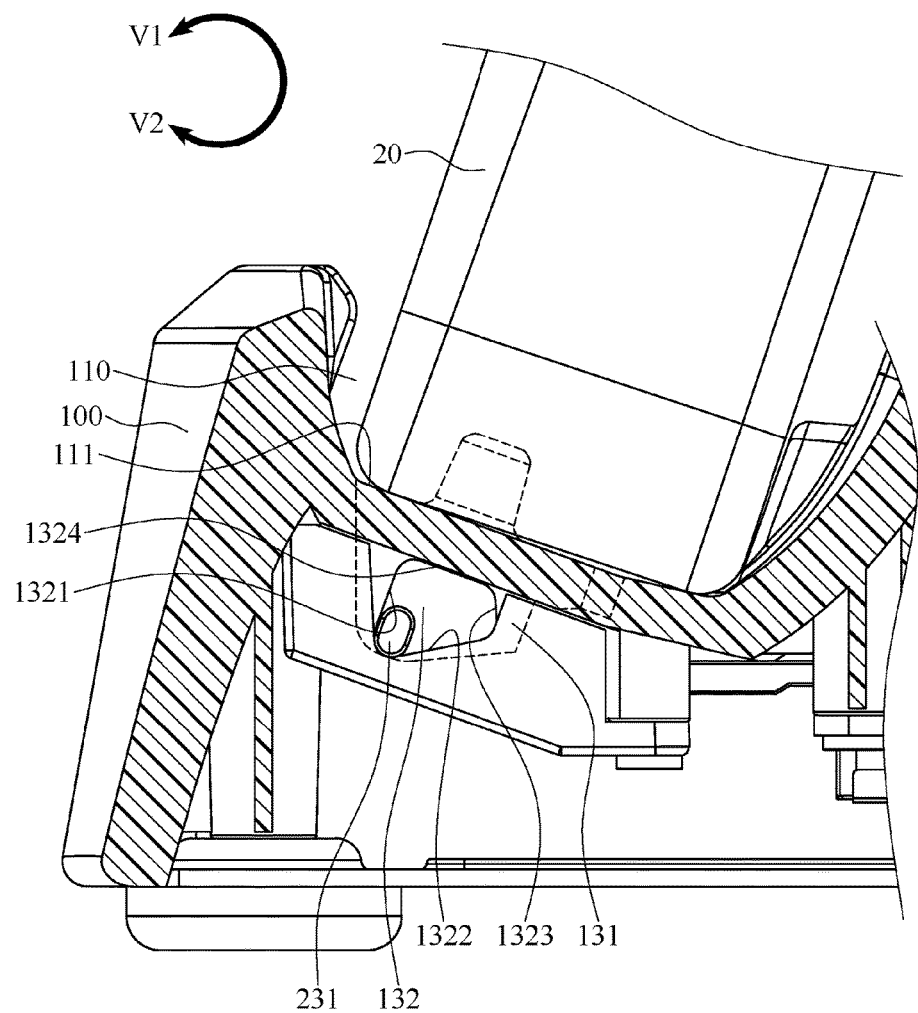
FIG. 3 is a cross-sectional view of the transmission dock taken along line 3-3 of FIG. 1.

FIG. 3 is a cross-sectional view of the transmission dock 10 taken along line 3-3 of FIG. 1. To render explanation and comprehension easy, FIG. 3 depicts a portion of an electronic device 20 and shows that the electronic device 20 is disposed in the receiving chamber 110. Referring to FIG. 2 and FIG. 3, in some embodiments, the first limiting structures 130 each comprise a sidewall 131 disposed in the casing 100 and connected to the chamber bottom 111. Each sidewall 131 has thereon a limiting opening 132. The two sidewalls 131 and the two limiting openings 132 flank the through opening 120. The body 210 is disposed between the two sidewalls 131. The length of the body 210 is less than the distance between the two sidewalls 131. The body 210 has a smaller width than the through opening 120. The length of the body 210 and the distance between the two sidewalls 131 are measured along the Y-axis of the Cartesian coordinate system as shown in FIG. 2. Both the width of the body 210 and the width of the through opening 120 are measured along the Z-axis of the Cartesian coordinate system as shown in FIG. 2. In some embodiments, the sidewalls 131 are substantially perpendicular to the chamber bottom 111, but the present invention is not limited thereto.

Each second limiting structure 230 comprises a protruding post 231. The two protruding posts 231 flank the body 210 and extend outward, i.e., in the direction away from the body 210. The two protruding posts 231 of the two second limiting structures 230 are penetratingly disposed in the two limiting openings 132 of the two first limiting structures 130, respectively. The body 210 is disposed between the two sidewalls 131. The two protruding posts 231 which flank the body 210 are penetratingly disposed in the two limiting openings 132, respectively. Since the limiting openings 132 have a larger diameter than the protruding posts 231, the protruding posts 231 can move finitely within the limiting openings 132 to drive the body 210 to move finitely relative to the sidewalls 131.

Figure 4:
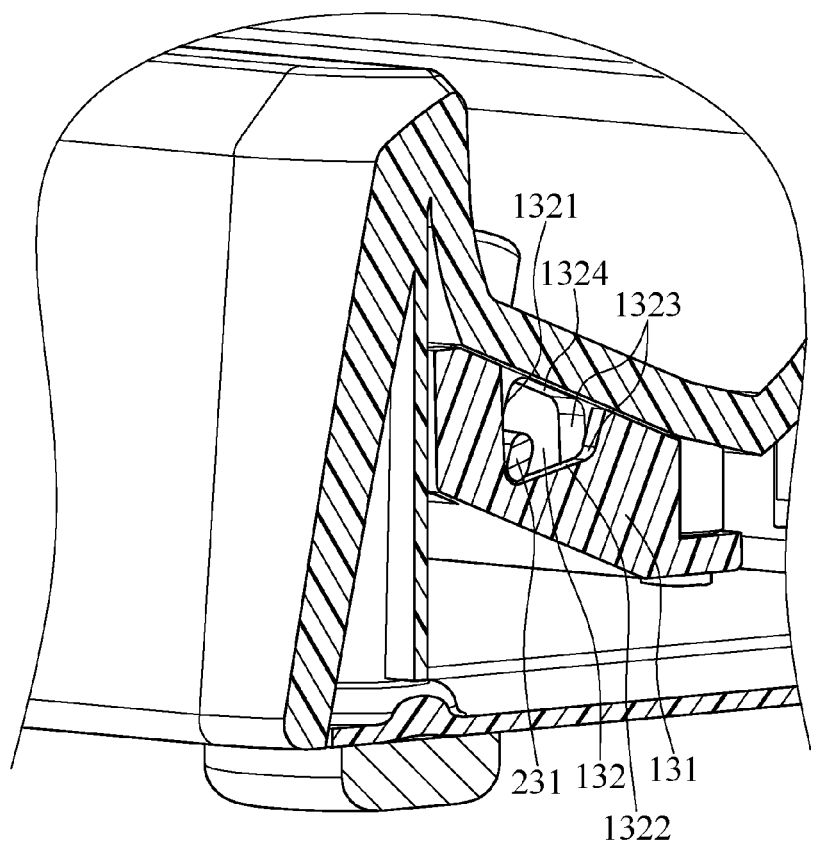
FIG. 4 is a partial enlarged view of a sidewall and a limiting opening of the transmission dock.

Referring to FIG. 4, there is shown a partial enlarged view of a sidewall 131 and a limiting opening 132 of the transmission dock 10. Referring to FIG. 2, FIG. 3 and FIG. 4, in some embodiments, the sidewall 131 comprises a first sidewall 1321, a second sidewall 1322, a third sidewall 1323 and a fourth sidewall 1324 which together form the limiting opening 132. The first sidewall 1321 and the third sidewall 1323 are opposite and face the chamber bottom 111. The second sidewall 1322 and the fourth sidewall 1324 are opposite and are disposed between the first sidewall 1321 and the third sidewall 1323. The fourth sidewall 1324 is closer to the chamber bottom 111 than the second sidewall 1322. The protruding posts 231 are movable within the limiting openings 132 but their range of movement is limited by the first sidewall 1321, second sidewall 1322, third sidewall 1323 and fourth sidewall 1324.

Therefore, given the limit mechanism of the two first limiting structures 130 and the two second limiting structures 230, the floatable connecting component 200 floats and undergoes a displacement relative to the transmission dock 10, the receiving chamber 110 and the chamber bottom 111 to a certain extent. The floatable connecting component 200 rises, tilts leftward or rightward, or tilts forward or rearward relative to the chamber bottom 111 of the transmission dock 10. For example, when the protruding posts 231 on the two sides of the floatable connecting component 200 move upward simultaneously, the floatable connecting component 200 rises in its entirety until the protruding posts 231 touch the fourth sidewall 1324. When the right protruding post 231 moves upward relative to the left protruding post 231, the floatable connecting component 200 tilts leftward. When the left protruding post 231 moves upward relative to the right protruding post 231, the floatable connecting component 200 tilts rightward. When the protruding posts 231 rotate in first direction V1 of FIG. 3 and move in the direction from the first sidewall 1321 to the third sidewall 1323, the floatable connecting component 200 tilts forward. When the protruding posts 231 rotate in second direction V2 of FIG. 3 and move in the direction from the third sidewall 1323 to the first sidewall 1321, the floatable connecting component 200 tilts rearward. Since the length of the body 210 is less than the distance between the two sidewalls 131, the floatable connecting component 200 moves leftward and rightward in the +/−Y direction of FIG. 2 relative to the chamber bottom 111 of the transmission dock 10. Since the body 210 has a lesser width than the through opening 120, the floatable connecting component 200 moves forward and rearward in the +/−Z direction of FIG. 2 relative to the chamber bottom 111 of the transmission dock 10.

Referring to FIG. 3, in some embodiments, the protruding posts 231 each have an oblong cross section, and thus the cross section of each protruding post 231 has two opposite straight lines and two opposite arcs. The two straight lines of each protruding post 231 move upward and downward across the first sidewall 1321 and the third sidewall 1323 to render the upward and downward movement of the floatable connecting component 200 smooth and stable. The two arcs of each protruding post 231 abut against the included angles between the sidewalls to thereby enhance the limiting or positioning effect. When the protruding posts 231 rotate and move between the first sidewall 1321 and the third sidewall 1323 simultaneously, one of the two arcs of each protruding post 231 moves across the second sidewall 1322 to render the forward and rearward tilt of the floatable connecting component 200 smooth and stable. Since the electronic device 20 is connected to the transmission interface 220 of the floatable connecting component 200, the electronic device 20 tilts or moves relative to the transmission dock 10 smoothly and steadily.

Referring to FIG. 3, in some embodiments, the first sidewall 1321 has a larger length than the third sidewall 1323, and an acute angle is formed between the extending direction of the second sidewall 1322 and the chamber bottom 111; hence, the included angle between the first sidewall 1321 and the second sidewall 1322 defines a corner capable of positioning. When the electronic device 20 is appropriately placed in the receiving chamber 110 and connected to the transmission interface 220, the electronic device 20 has its bottom pressing against the chamber bottom 111 and its back abutting against the rear side of the receiving chamber 110, whereas the body 210 of the floatable connecting component 200 is flush with the chamber bottom 111; meanwhile, from the perspective of the horizontal carrying surface of the transmission dock 10, the first sidewall 1321 and the second sidewall 1322 tilt downward and converge to form the lowest point of the limiting opening, and the lowest point becomes a corner capable of positioning. Due to the corner capable of positioning, the protruding posts 231 spontaneously end up at the lowest point of the included angle between the first sidewall 1321 and the second sidewall 1322 under gravity. The protruding posts 231 will not escape from the lowest point of the included angle between the first sidewall 1321 and the second sidewall 1322, unless the protruding posts 231 are subjected to a hitting force of a specific strength or undergo vibration of a specific magnitude. Even if the protruding posts 231 escape from the lowest point, the protruding posts 232 will return to the lowest point soon. Therefore, the electronic device 20 can steadily maintain the state in which its bottom presses against the chamber bottom 111, and its back abuts against the rear side of the receiving chamber 110.

Referring to FIG. 2, in some embodiments, the floatable connecting component 200 further comprises two magnetic units 240. The two magnetic units 240 are disposed on the body 210 and on the two sides of the transmission interface 220, respectively. Two magnets (not shown) are disposed at the bottom of the electronic device 20 and correspond in position to the two magnetic units 240.

In some embodiments, the two magnetic units 240 of the floatable connecting component 200 are an N-pole magnet and an S-pole magnet, whereas two magnets of the electronic components are an S-pole magnet and an N-pole magnet, so as to effectuate positioning and foolproofing. For example, if the direction in which the electronic device 20 is inserted into the receiving chamber 110 is correct, the S-pole magnet of the electronic device 20 will approach the N-pole magnet of the floatable connecting component 200, whereas the N-pole magnet of the electronic device 20 will approach the S-pole magnet of the floatable connecting component 200, and in consequence the process of connecting the electronic device 20 and the transmission interface 220 will be smooth as a result of magnetic attraction between the electronic device 20 and the floatable connecting component 200. If the direction in which the electronic device 20 is inserted into the receiving chamber 110 is incorrect, the S-pole magnet of the electronic device 20 will approach the S-pole magnet of the floatable connecting component 200, whereas the N-pole magnet of the electronic device 20 will approach the N-pole magnet of the floatable connecting component 200, and in consequence a resultant force of repulsion between the electronic device 20 and the floatable connecting component 200 is perceived by the user, alerting the user to the incorrect direction of the electronic device 20 instantly.

Referring to FIG. 2, in some embodiments, the floatable connecting component 200 further comprises two positioning units 250. The two positioning units 250 are disposed on the body 210 and on the two sides of the transmission interface 220, respectively. The two positioning units 250 are fixed to the two sides of the body 210. The two magnetic units 240 are disposed between the two positioning units 250 and the transmission interface 220, respectively.

In some embodiments, each positioning unit 250 is post-shaped. The positioning units 250 extend upward from the body 210 in its axial direction (see the X-axis of the Cartesian coordinate system as shown in FIG. 2) by a specific height. The axial direction of the positioning units 250 is perpendicular to the lengthwise direction of the body 210 (see the Y-axis of the Cartesian coordinate system as shown in FIG. 2.) The height of the positioning units 250 relative to the body 210 in the axial direction is larger than the height of the resilient terminals 221 of the transmission interface 220 relative to the body 210. Two slots (not shown) are disposed at the bottom of the electronic device 20 and correspond in shape and position to the two positioning units 250, respectively. To place the electronic device 20 in the receiving chamber 110 and connect the electronic device 20 to the transmission interface 220, the user inserts the two positioning units 250 into the two slots of the electronic device 20 until the connection interface of the electronic device 20 is flush with the transmission interface 220, thereby effectuating positioning. The resilient terminals 221 of the transmission interface 220 are being inserted into the terminal jacks of the connection interface of the electronic device 20 while the two positioning units 250 are penetrating the two slots, and the insertion process does not end until the connection between the electronic device 20 and the transmission interface 220 is done.

Referring to FIG. 2, in some embodiments, the floatable connecting component 200 further comprises two resilient ground terminals 260. The two resilient ground terminals 260 are disposed on the body 210 and on two sides of the transmission interface 220, respectively. The resilient ground terminals 260 have substantially the same resilient structure as the resilient terminals 221. The two resilient ground terminals 260 are disposed between the transmission interface 220 and the two magnetic units 240, respectively. Two grounding jacks (not shown) are disposed at the bottom of the electronic device 20 and correspond in shape and position to the resilient ground terminals 260, respectively. The two resilient ground terminals 260 are inserted into the two grounding jacks, respectively, as soon as the user places the electronic device 20 in the receiving chamber 110 and finishes the connection of the electronic device 20 and the transmission interface 220, thereby grounding the electronic device 20. In some embodiments, the area of the radial cross-section of the resilient ground terminals 260 is larger than that of the resilient terminals 221 of the transmission interface 220 to enhance the structural strength of the resilient ground terminals 260, thereby reinforcing the connection between the electronic device 20 and the transmission interface 220.

Figure 5:
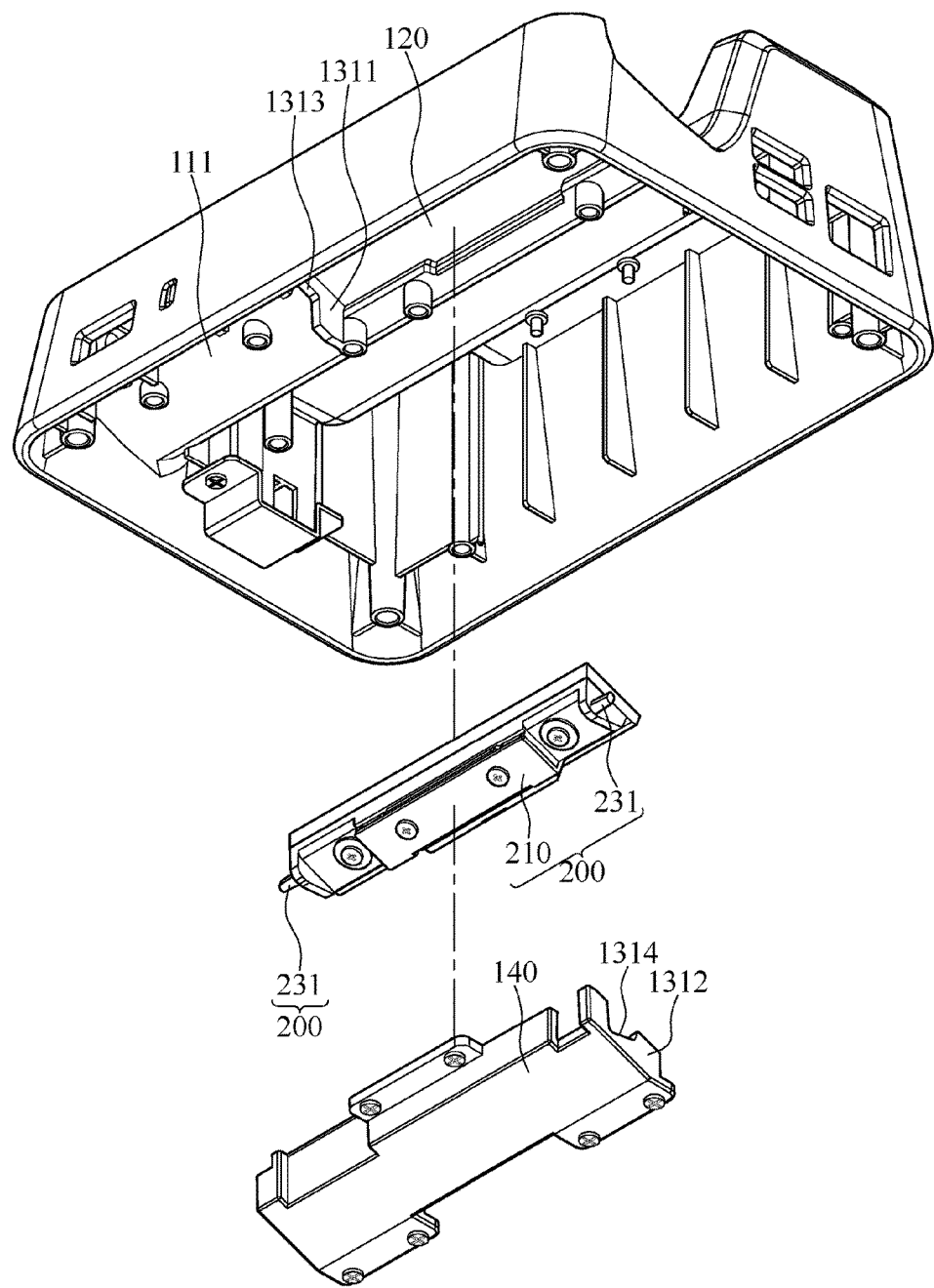
FIG. 5 is a partial exploded view of the transmission dock shown in FIG. 1.

Referring to FIG. 5, there is shown a partial exploded view of the transmission dock 10 shown in FIG. 1. In this embodiment, the sidewall 131 comprises a first portion 1311 and a demountable second portion 1312. Therefore, the sidewall 131 is formed from the first portion 1311 and the second portion 1312. The first portion 1311 is connected to the chamber bottom 111. The first portion 1311 and the casing 100 are integrally formed; for example, the first portion 1311 and the casing 100 are integrally formed by injection molding. By contrast, the second portion 1312 and the casing 100 are independent of each other; in other words, the second portion 1312 and the casing 100 are not integrally formed. The second portion 1312 and the first portion 1311 are connected to form the sidewall 131 and the limiting opening 132.

In some embodiments, the casing 100 comprises an inner lid 140. The inner lid 140 is disposed in the casing 100. The two second portions 1312 are disposed on two opposing sides of the inner lid 140, respectively, and correspond in position to the two first portions 1311, respectively. In some embodiments, the two second portions 1314 and the inner lid 140 are integrally formed. The first portion 1311 is plate-shaped and has a recess 1313 which is in communication with the outside. The second portions 1312 is plate-shaped and has a recess 1314 which is in communication with the outside. When the first portion 1311 is connected to the second portions 1312, the recess 1313 of the first portion 1311 and the recess 1314 of the second portions 1312 match together and thereby form the limiting openings 132. The inner lid 140 and the second portions 1312, which are demountable, are conducive to the mounting of the floatable connecting component 200 on the casing 100, because the protruding posts 231 which extend outward are disposed on two sides of the body 210, respectively. Therefore, the total length of the floatable connecting component 200 is larger than the distance between the sidewalls 131; as a result, it is difficult for an assembly worker to mount the floatable connecting component 200 on the casing 100, because the sidewalls 131 stop the protruding posts 231 from entering the limiting openings 132. With the demountable inner lid 140, to mount the floatable connecting component 200 on the casing 100, an assembly worker aligns the protruding posts 231, puts the protruding posts 231 in the recesses 1313 of the two first portions 1311, aligns the second portions 1312 with the first portions 1311, and connects the first portions 1311 to the second portions 1312. Therefore, the two protruding posts 231 are confined to the two limiting openings 132 formed by connecting the first portions 1311 to the second portions 1312. In this embodiment, the inner lid 140 is fastened to the casing 100 by screws such that the first portions 1311 and the second portions 1312 are connected and thereby fixed in place.

In a variant embodiment, the sidewalls 131 dispense with the demountable second portions 1312 such that the sidewalls 131 and the casing 100 are integrally formed. In this situation, to mount the floatable connecting component 200 on the casing 100, an assembly worker exerts a stress of specific magnitude on the sidewalls 131 such that the sidewalls 131 stick out slightly, resiliently and thereby the distance between the sidewalls 131 increases; hence, not only can the body 210 squeeze through the two sidewalls 131, but the two protruding posts 231 can also enter the limiting openings 132 of the two sidewalls 131. In a variant embodiment, the positions of the protruding posts 231 and the limiting openings 132 on the casing 100 and the floatable connecting component 200 are subject to changes. For example, the two first limiting structures 130 which flank the through opening 120 comprise the two protruding posts 231 extending toward each other, whereas the two second limiting structures 230 disposed on two sides of the body 210 comprises the two sidewalls 131 with the limiting openings 132, allowing the two protruding posts 231 to be penetratingly disposed in the two limiting openings 132, respectively. In this situation, to mount the floatable connecting component 200 on the casing 100, an assembly worker exerts a stress of specific magnitude on the protruding posts 231 or the sidewalls 131 such that the protruding posts 231 move outward slightly (for example, the plates connected to the protruding posts 231 stick out slightly, resiliently) or the sidewalls 131 retract slightly, resiliently, allowing the two protruding posts 231 to enter the two limiting openings 132 disposed on two sides of the body 210.

Figure 6:
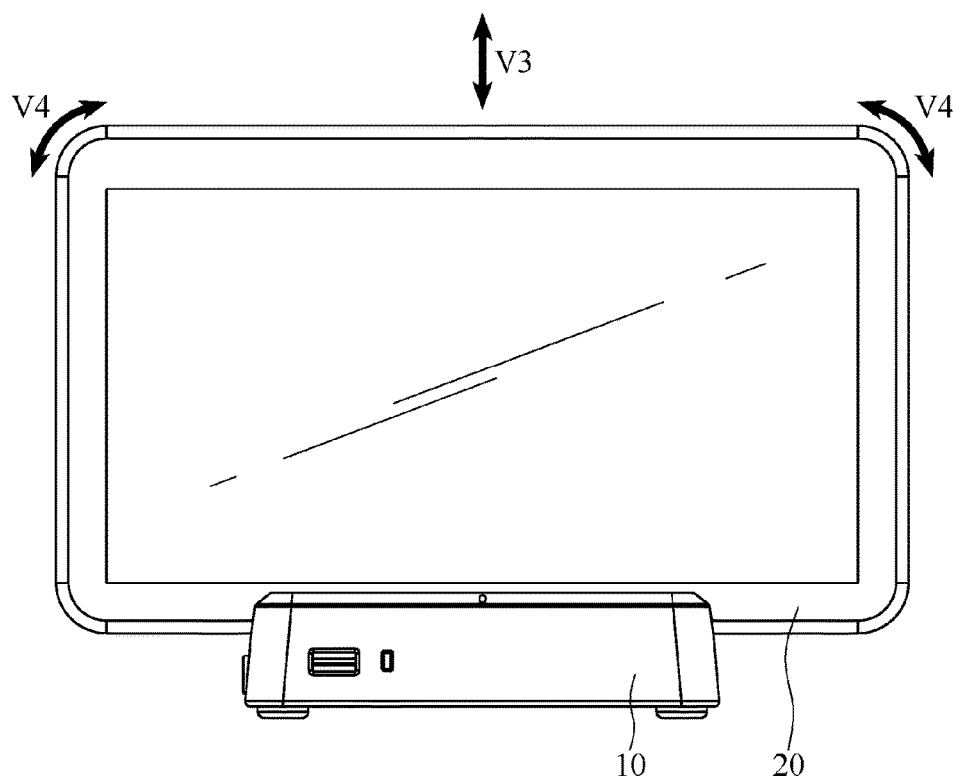
FIG. 6 is a front view of an electronic device and the transmission dock shown in FIG. 1.

Referring to FIG. 6, there is shown a front view of the electronic device 20 and the transmission dock 10 shown in FIG. 1. When the electronic device 20 is placed in the receiving chamber 110 of the transmission dock 10 and connected to the transmission interface 220, even if the electronic device 20 and the transmission dock 10 are hit or shake and thereby the electronic device 20 undergoes an instantaneous displacement relative to the transmission dock 10, for example, the electronic device 20 moves upward and downward or vibrates in third direction V3 as indicated by the two-way arrow, or the electronic device 20 sways laterally in fourth direction V4 as indicated by the arcuate two-way arrows. Since the floatable connecting component 200 moves together with the electronic device 20, the transmission interface 220 keeps connecting with the electronic device 20 and thus does not get disconnected as a result of the instantaneous displacement of the electronic device 20, and in consequence the electronic device 20 can be charged continuously or can perform transmission data continuously without interruption. In this embodiment, due to the floatable connecting component 200, the electronic device 20 can be charged continuously or can perform transmission data continuously, provided that the displacement of the electronic device 20 is less than 5 mm. The displacement applies to the situation where the electronic device 20 rises in its entirety, or the situation where the two opposing ends of the electronic device 20 take turns rising such that the electronic device 20 sways laterally.

Figure 7:
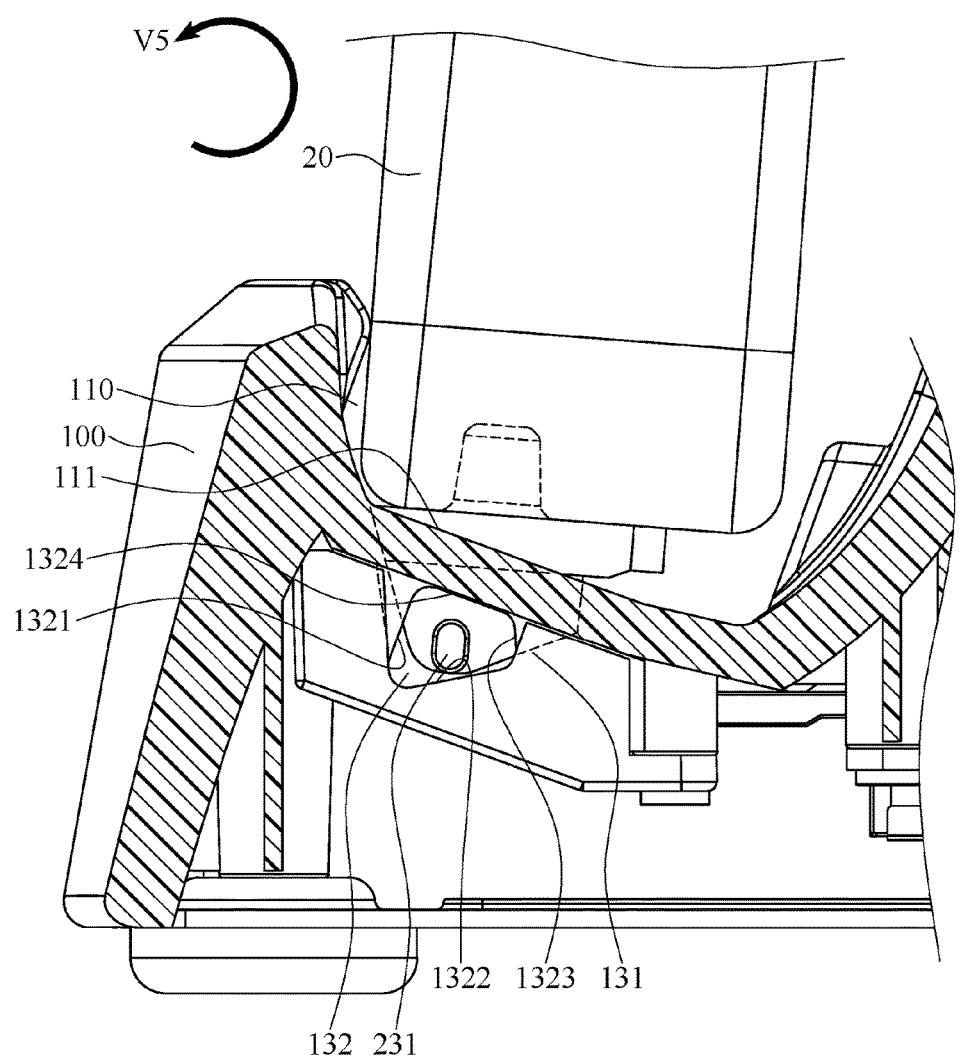
FIG. 7 is a partial cross-sectional view of the forward-tilted electronic device and the transmission dock shown in FIG. 1.

Referring to FIG. 7, there is shown a partial cross-sectional view of the forward-tilted electronic device 20 and the transmission dock 10 shown in FIG. 1. When the electronic device 20 is appropriately placed in the receiving chamber 110 and connected to the transmission interface 220 such that the electronic device 20 is in a stable state, the electronic device 20 has its bottom pressing against the chamber bottom 111. Since the chamber bottom 111 tilts relative to the horizontal carrying surface of the transmission dock 10, the electronic device 20 tilts rearward slightly relative to the horizontal carrying surface and has its back abutting against the rear side of the receiving chamber 110; meanwhile, the protruding posts 231 end up at the lowest point of the included angle between the first sidewall 1321 and the second sidewall 1322, whereas the body 210 is flush with the chamber bottom 111. When the electronic device 20 and the transmission dock 10 are hit or begin to shake, the electronic device 20 is likely to topple over, as shown in FIG. 7. At this point in time, the protruding posts 231 rotate in fifth direction V5 and move toward the third sidewall 1323 simultaneously, whereas the body 210 tilts forward together with the electronic device 20; hence, the transmission interface 220 keeps connecting with the electronic device 20 and keeps charging or transmitting data. In the situation where the rotational angle by which the electronic device 20 tilts forward is becoming larger, the protruding posts 231 move toward the included angle between the third sidewall 1323 and the fourth sidewall 1324. In this embodiment, due to the floatable connecting component 200, the electronic device 20 will keep being charged or keep transmitting data, provided that the rotational angle by which the electronic device 20 tilts forward is less than 10 degrees.

In conclusion, the transmission dock for an electronic device, which is provided according to an embodiment of the present invention, is characterized in that the floatable connecting component floats and undergoes a displacement relative to the chamber bottom of the transmission dock to a certain extent. With the electronic device being disposed in the receiving chamber of the transmission dock and appropriately connected to transmission interface of the floatable connecting component, if the electronic device or the transmission dock is hit or begins to shake and thus the electronic device sways laterally or tilts forward relative to the transmission dock, the floatable connecting component will undergo a displacement accordingly such that the transmission interface keeps connecting with the electronic device, rendering their electrical connection relationship stable and inseverable, to ensure that the electronic device can be charged through the transmission dock and can perform transmission data through the transmission dock smoothly without interruption.

Although the present invention is disclosed above by preferred embodiments, the preferred embodiments are not restrictive of the present invention. Any persons skilled in the art can make some changes and modifications to the preferred embodiments without departing from the spirit of the present invention. Accordingly, the legal protection for the present invention should be defined by the appended claims.

What is claimed is:

1. A transmission dock for an electronic device, comprising:
    a casing comprising a receiving chamber and two first limiting structures, with a through opening disposed at a chamber bottom of the receiving chamber, wherein the two first limiting structures flank the through opening; and
    a floatable connecting component, comprising:
        a body movably disposed in the through opening;
        a transmission interface disposed on the body; and
        two second limiting structures disposed on two opposing sides of the body, respectively, wherein the two second limiting structures and the two first limiting structures moveably mate with each other, respectively, and limit each other, respectively,
        wherein the first limiting structures each comprise a sidewall having thereon a limiting opening, and each of the sidewalls comprises a first sidewall, a second sidewall, a third sidewall and a fourth sidewall which together form the limiting opening, with the first and third sidewalls being opposite and facing the chamber bottom, allowing the second and fourth sidewalls to be opposite and disposed between the first and third sidewalls; and wherein the second limiting structures each comprise a protruding post, allowing the two protruding posts to be penetratingly disposed in the two limiting openings, respectively.

2. The transmission dock for an electronic device according to claim 1, wherein the protruding posts each have an oblong cross section.

3. The transmission dock for an electronic device according to claim 1, wherein the first sidewall has a larger length than the third sidewall.

4. The transmission dock for an electronic device according to claim 3, wherein the fourth sidewall is closer to the chamber bottom than the second sidewall, and an acute angle is formed between an extending direction of the second sidewall and the chamber bottom.

5. The transmission dock for an electronic device according to claim 1, wherein the sidewall comprises a first portion and a demountable second portion which are connected to form the limiting opening, with the first portion positioned at the chamber bottom.

6. The transmission dock for an electronic device according to claim 1, wherein the floatable connecting component further comprises two magnetic units disposed on the body and on two sides of the transmission interface, respectively.

7. The transmission dock for an electronic device according to claim 1, wherein the floatable connecting component further comprises two positioning units disposed on the body and on two sides of the transmission interface, respectively.

8. The transmission dock for an electronic device according to claim 1, wherein the transmission interface comprises a plurality of resilient terminals.

9. The transmission dock for an electronic device according to claim 1, wherein the floatable connecting component further comprises two resilient ground terminals disposed on the body and on two sides of the transmission interface, respectively.

10. The transmission dock for an electronic device according to claim 1, wherein the first limiting structures each comprise a protruding post, and the second limiting structures each comprise a sidewall, with the sidewall having thereon a limiting opening, allowing the two protruding posts to be penetratingly disposed in the two limiting openings, respectively.

* * * * *